Oct. 18, 1927.
H. J. OLSON
1,645,770
FORAGE MILL
Filed April 8, 1925
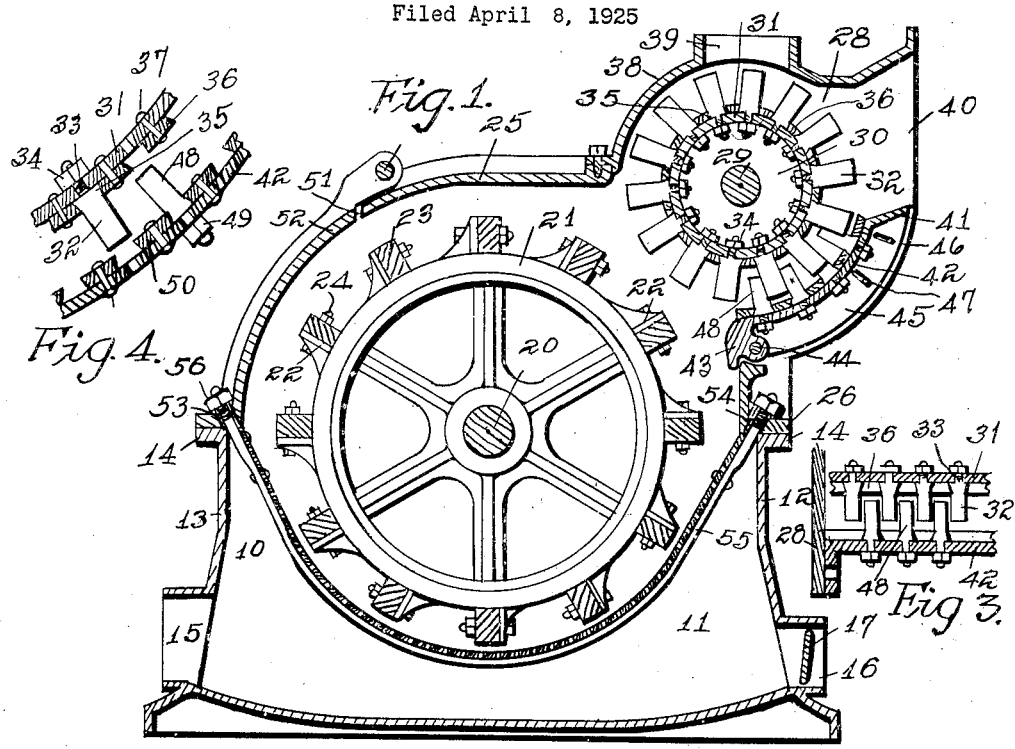
Fig. 1.
Fig. 4.
Fig. 3.
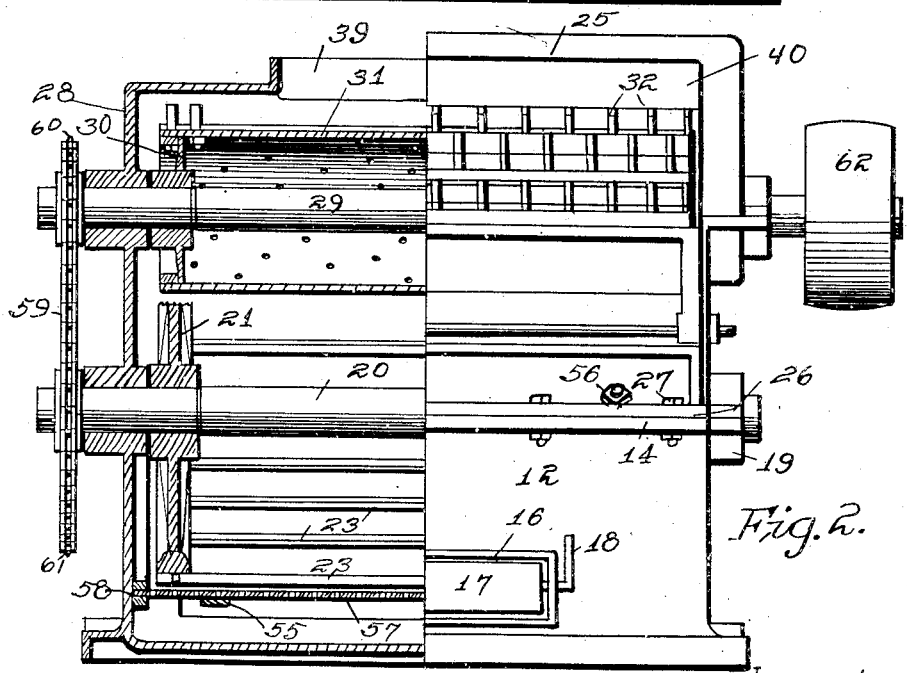
Fig. 2.
Inventor
Harry J. Olson
by Orwig & Hague, Att'ys.

Patented Oct. 18, 1927.

1,645,770

UNITED STATES PATENT OFFICE.

HARRY J. OLSON, OF DES MOINES, IOWA, ASSIGNOR, BY DIRECT AND MESNE ASSIGNMENTS, TO OLSON MILL COMPANY, OF DES MOINES, IOWA, A CORPORATION OF OHIO.

FORAGE MILL.

Application filed April 8, 1925. Serial No. 21,580.

The object of my invention is to provide a mill of simple, durable and inexpensive construction which is adapted to reduce the forage into a fine condition so that it may be easily handled and economically fed to animals.

A further object is to provide a mill for forage having two sets of devices for reducing the forage to a fine condition, the said devices being so arranged that one is adapted to reduce the forage to comparatively small particles, while the second device completes the operation of reducing it to a still finer condition.

A further object is to provide a forage mill having means whereby the mill may be adapted to handle a number of different kinds of materials, such as corn fodder, oats and hay.

A further object is to provide in a forage mill a reducing mechanism which is capable in a single operation of splitting and dividing the forage longitudinally of its stalks and at the same time cutting and subdividing it transversely.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a longitudinal sectional view of my improved mill.

Figure 2 is an end elevation showing the device partially in section.

Figure 3 is a detail sectional view taken on the line 3—3 of Figure 1.

Figure 4 is an enlarged, detail, sectional view of a portion of the cylinder and its concave plate, showing the manner in which the teeth are mounted, and also the transverse cutter bars.

The numeral 10 indicates the base of my improved mill which is provided with side members 11, a front member 12 and a back member 13. The side members 11 and the end members 12 and 13 are provided with a flange 14 at their top edges. The member 13 is provided with an outlet opening 15 near its bottom edge while the member 12 is provided with an inlet opening 16. The opening 16 is provided with a damper 17 actuated by means of a handle 18. The top edges of the members 11 are provided with a bearing 19 in which is mounted a horizontally arranged shaft 20.

The shaft 20 is provided with a pair of circular webs 21, each of which has in its periphery a series of outwardly extending lugs 22, the lugs of one of the webs 21 being placed in longitudinal alinement with the lugs of the opposite member 21. The corresponding lugs of said members 21 are provided with beater bars 23 secured in position by means of bolts 24, said bars being located with one edge adjacent to the periphery of the member 21 and one of its faces adjacent to the front face of the lug 22. The bars 23 are formed rectangular in cross section and provided with sharp right angular corners.

The top housing 25 is provided for the base 10 having its lower edge provided with flanges 26 designed to rest on the flanges 14, the two flanges being secured together by means of suitable bolts 27. The housing 25 is provided with an extension 28 in which is mounted a shaft 29 parallel with the shaft 20 and located in a common plane with the said shaft 20 and at an angle of about 45° from the horizontal.

The shaft 29 is provided with a pair of circular heads 30 designed to receive and support a steel tube 31, said tube 31 being provided with a series of teeth 32. The inner ends of the teeth 32 are each provided with a threaded portion 33, each of which has a nut 34. The inner end of each of the teeth 32 is provided with an angular flange 35 which serves to form a shoulder designed to rest adjacent to the cylinder 31, to support the teeth against lateral movement. The teeth 32 are arranged in longitudinal rows across the periphery of said cylinder.

A cutter bar 36 is designed to rest adjacent to the outer surface of the cylinder 31 between the rows of teeth. The back and forward edges of said cutter bar are slightly beveled inwardly, so that the said edges will fit snugly against the inclined shoulders 35 of the teeth 32, as clearly illustrated in Figure 4. The bars 36 are secured in position adjacent to the cylinder 31 by rivets 37.

By this arrangement it will be seen that the bars 36 serve to act as an anchor against the teeth 32 from being thrown outwardly in case the nuts 34 should accidentally come loose. The outer angular edges of the bars 36 serve to also perform the function of a cutter, in the manner hereinafter more fully set forth.

The cylinder is provided with a circular cap 38 which is provided with an air opening 39. The front side of the cap 38 is provided with a feed opening 40 having at its lower edge a downwardly and inclined feed plate 41. Said feed plate 41 is formed integral with the circular concaved plate 42. The inner edge of said concaved plate 42 is provided with a downwardly extending portion 43 which is pivotally connected to the side members of the housing 25 by means of a rod 44. Each of the concaved plates 42 is provided with a flange 45 designed to rest adjacent to the side members of the housing 25, as clearly shown in Figures 1 and 3. The flanges 45 are provided with slots 46 through which adjusted bolts 47 extend.

It will be seen that the concaved plate 42 may be adjusted toward and from the teeth 32 of the cylinder. The inner face of the concaved plate 42 is provided with a series of concave teeth 48 similar to the teeth 32, and are secured in position by means of nuts 49, the teeth 48 being arranged in longitudinal rows, and a cutter bar 50 is arranged between the rows. Said bars 50 are similar to the bar 36.

The back side of the housing 25 is provided with an opening 51 provided with a door 52, said door being pivoted at its upper end, while its lower end is designed to rest against the flange 14 and is provided with openings 53. A similar set of openings 54 is provided in the front end of the housing 25. The openings 54 and 53 are designed to receive the rods 55, each end of which is screw threaded and provided with a nut 56. The rods 55 have their central portions flattened and designed to support a semi-circular screen 57 which is placed beneath, and concentric with, the bars 23. The screen 57 is formed preferably of perforated sheet metal. The nuts 56 provide means whereby the screen may be detachably placed in position. The said screen is designed to enter a groove 58 in the side members 11.

Thus it will be seen that by removing the nuts 56, the cover plate 52 may be elevated, after which the screen 57 may be removed from position by moving it upwardly and outwardly and sliding it through the grooves 58. A different size screen may then be placed in position if so desired, and the nuts 56 replaced, which also serve to secure the cover plate 52 in position.

The opening 15 is designed to be placed in connection with a suction fan, while the opening 39 is designed to be placed in connection with an air inlet pipe, and the opening 16 is in communication with the outside atmosphere.

The teeth 32 and 48 are formed rectangular in cross section and have sharp right angular corners and are set in position in such a manner that the teeth 32 will travel between the teeth 48 as the cylinder is rotated.

The shafts 20 and 29 are driven in unison by means of a sprocket chain 59 mounted on sprockets 60 and 61. The sprocket 60 is secured to the shaft 29, while the sprocket 61 is secured to the shaft 20. The shaft 29 is also provided with a belt pulley 62. The gear ratio between the sprockets 60 and 61 is such that the shaft 20 will rotate at about one-third the speed of the shaft 29. The said shaft 29 is operated at approximately 1500 revolutions per minute.

Let it be assumed that the device is being operated and that a suction is being created in the openings 15, and air entering the openings 39 and 16, then if feed is placed in the opening 40, assuming first that it is corn fodder with the stalks extending substantially radially to the cylinder 31, then the butts of the stalks will be engaged by the teeth 32 causing them to be split while the ends of the stalks will be engaged by the cutting bars 36, which will both cut the stalks longitudinally and transversely. The severed portions will then travel backwardly and will be further reduced by the coacting teeth and cutter bars and will be delivered to the space occupied by the beater cylinder, the material being discharged to the inner surface of the screen 57 where it will again be torn and ground into still finer particles, the fine particles passing through the openings of the screen 57 and will enter the air currents and be discharged through the openings 15.

It will be seen that currents of air will pass downwardly through the opening 39 and above the cylinder 31 and between the teeth 32, which will cause the particles of material to be dislodged from the teeth 32. The air passing through the screen 57 will assist in causing the particles of ground material to pass through said screen. Any particles that are too big to pass through the screen will be engaged by the beater bars 23. Some of the particles will pass part way through and project in a radial manner, and when in such condition it will be seen that the beater bars will very rapidly reduce them to smaller particles. The amount of suction through the screen 57 and through the opening 39 can be regulated by controlling the valve 17.

It will be seen in Figure 4 that the ends of the teeth 32 extend comparatively close to the cutter bars 50, the corners of the ends of said teeth and the said cutter bars providing additional cutting means.

Thus it will be seen I have provided a forage mill which is of comparatively simple construction, and which is positive in its operation and which will very rapidly reduce any coarse forage to a fine and powdered condition in such a manner that it can be easily handled, and which is economical to feed.

By the use of this mill, coarse forage, such as corn fodder, may be reduced to a condition where it can be economically fed, it being generally understood that the food value of this kind of feed is high, but the difficulty heretofore has been to put it in such condition where it will be readily digested by the animals.

It will further be seen that I have provided a mill in which two distinct operations are involved for reducing the forage to a fine condition such as desired for food. By this method it is possible to reduce the material with a considerably less power than if only one mechanism was employed, due to the fact that the operation may be more efficiently accomplished. By providing a mechanism for reducing the material to a semi-powdered condition requires one form of construction, while the mechanism for reducing the particles to a still finer condition necessarily required a second form of construction. It will readily be seen that a beater such as employed in my device would not be adapted for reducing the heavy and coarse stalks to a powdered condition, while the teeth and the cylinder are particularly adapted to split and cut the material into chunks or small particles, but would not be as efficient in reducing the chunks and smaller particles to a powdered stage.

I claim as my invention:

1. A forage mill comprising a supporting frame, a shaft rotatively mounted therein, a cylinder mounted on said shaft having a series of radially and outwardly extending teeth arranged in longitudinal rows, a cutter bar mounted between each pair of adjacent rows of teeth and adjacent to said cylinder, a concave having a series of rows of radially and inwardly projecting teeth, the teeth of said cylinder being adapted to travel between the teeth of said concave, a cutter bar between each pair of adjacent rows of teeth and adjacent to said concave.

2. A forage mill comprising a supporting frame, a shaft rotatively mounted therein, a cylinder mounted on said shaft having a series of radially and outwardly extending teeth arranged in longitudinal rows, a cutter bar mounted between each pair of adjacent rows of teeth and adjacent to said cylinder, a concave having a series of rows of radially and inwardly projecting teeth, the teeth of said cylinder being adapted to travel between the teeth of said concave, a cutter bar between each pair of adjacent rows of teeth and adjacent to said concave, the edges of said bars being beveled, and the ends of said teeth being designed to travel close to the said cutter bars.

3. A forage mill comprising a supporting frame, a shaft rotatively mounted therein, a cylinder mounted on said shaft having a series of radially and outwardly extending teeth arranged in longitudinal rows, a cutter bar mounted between each pair of adjacent rows of teeth and adjacent to said cylinder, a concave having a series of rows of radially and inwardly projecting teeth, the teeth of said cylinder being adapted to travel between the teeth of said concave, a cutter bar between each pair of adjacent rows of teeth and adjacent to said concave, the edges of said bars being beveled, and the ends of said teeth being designed to travel close to the said cutter bars, and means for moving said concave toward and from said cylinder.

HARRY J. OLSON.

CERTIFICATE OF CORRECTION.

Patent No. 1,645,770.  Granted October 18, 1927, to

HARRY J. OLSON.

It is hereby certified that the State of Incorporation of the assignee in the above numbered patent was erroneously given as Ohio, whereas said State should have been given as Iowa, as shown by the record of assignments in this office; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.